(12) United States Patent
Desautel

(10) Patent No.: US 11,421,780 B2
(45) Date of Patent: Aug. 23, 2022

(54) READING INTERNAL TEMPERATURE OF CONTINUOUSLY VARIABLE TRANSMISSIONS

(71) Applicant: High Performance Harry's Inc., Albany, MN (US)

(72) Inventor: Harold Desautel, Albany, MN (US)

(73) Assignee: High Performance Harry's Inc., Albany, MN (US)

( * ) Notice: Subject to any disclaimer, the term of this patent is extended or adjusted under 35 U.S.C. 154(b) by 0 days.

(21) Appl. No.: 17/208,367

(22) Filed: Mar. 22, 2021

(65) Prior Publication Data
US 2021/0293331 A1 Sep. 23, 2021

Related U.S. Application Data

(60) Provisional application No. 62/992,178, filed on Mar. 20, 2020.

(51) Int. Cl.
*F16H 61/12* (2010.01)
*F16H 61/662* (2006.01)

(52) U.S. Cl.
CPC .......... *F16H 61/12* (2013.01); *F16H 61/662* (2013.01); *F16H 2061/124* (2013.01); *F16H 2061/1276* (2013.01)

(58) Field of Classification Search
CPC .. F16H 61/12; F16H 61/662; F16H 2061/124; F16H 261/1276; F16H 9/04
See application file for complete search history.

(56) References Cited

U.S. PATENT DOCUMENTS

| 4,691,987 | A | 9/1987 | Ebner |
| 6,146,307 | A * | 11/2000 | Takizawa ............ F16H 61/6648 477/37 |
| 7,932,081 | B2 | 4/2011 | Lair |
| 9,618,394 | B2 | 4/2017 | Campbell |

(Continued)

FOREIGN PATENT DOCUMENTS

| CN | 202687406 U | 1/2013 |
| DE | 102010038817 A1 | 2/2012 |

OTHER PUBLICATIONS

The Gates Rubber Company, "Hot and Cold Running Belts," GatesFacts Technical Information Library, Oct. 1992, Denver, CO.

*Primary Examiner* — Edwin A Young
(74) *Attorney, Agent, or Firm* — Forsgren Fisher; Daniel A. Tysver; James M. Urzedowski

(57) ABSTRACT

A system and method are presented that measure the temperature of a component in a continuously variable transmission (CVT) system. An infrared temperature sensor is mounted in a thermally insulating sensor housing such that the sensor is located within the interior of a CVT housing and aimed at the component. The component can be a belt in the CVT system or a stationary sheave in one of the two clutches of the CVT system. The sensor housing can have a cup and a stem with the sensor being positioned within that portion of the sensor housing positioned within the interior of the CVT housing. When the stem is in the interior of the CVT housing, a nut can be used to secure the sensor housing to the CVT housing while protecting the infrared sensor from damage. An air temperature sensor in the exhaust port can provide supplemental temperature readings.

20 Claims, 12 Drawing Sheets

(56) References Cited

U.S. PATENT DOCUMENTS

| | | |
|---|---|---|
| 2003/0160156 A1 | 8/2003 | Duhamel |
| 2010/0290796 A1 | 11/2010 | Sato |
| 2014/0074345 A1 | 3/2014 | Gabay |
| 2015/0028228 A1 | 1/2015 | Almasy |
| 2017/0276551 A1 | 9/2017 | Campbell |
| 2019/0316940 A1* | 10/2019 | Tener .................. G01J 5/045 |
| 2021/0231211 A1* | 7/2021 | Itoo .................. F16H 57/0489 |

* cited by examiner

Infrared Sensor Over Belt

| Material | Thermal conductivity (W/m K) |
|---|---|
| Copper (pure) | 399 |
| Gold (pure) | 317 |
| Aluminum (pure) | 237 |
| Iron (pure) | 80.2 |
| Carbon steel (1%) | 43 |
| Stainless Steel (18/8) | 15.1 |
| Glass | 0.81 |
| Plastics | 0.2 - 0.3 |

Infrared Sensor Over Stationary Primary Sheave

Infrared Sensor Over
Stationary Secondary Sheave

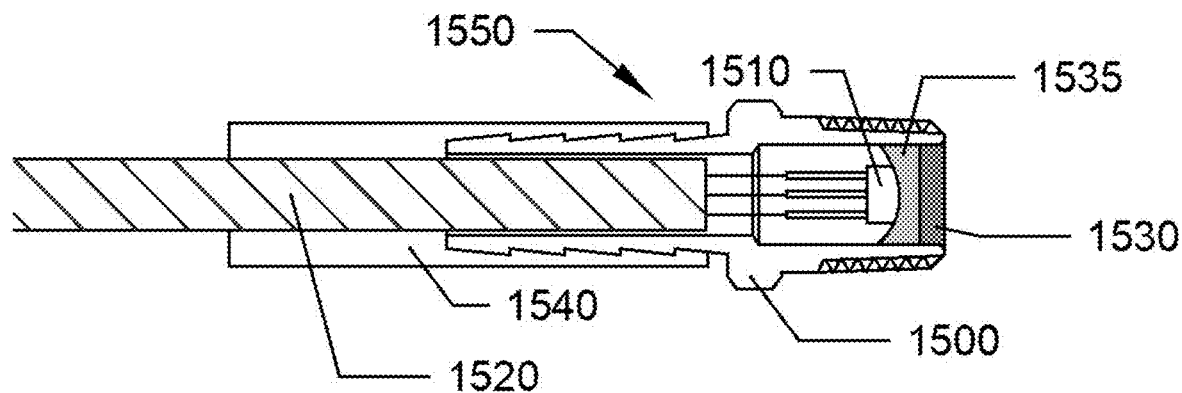
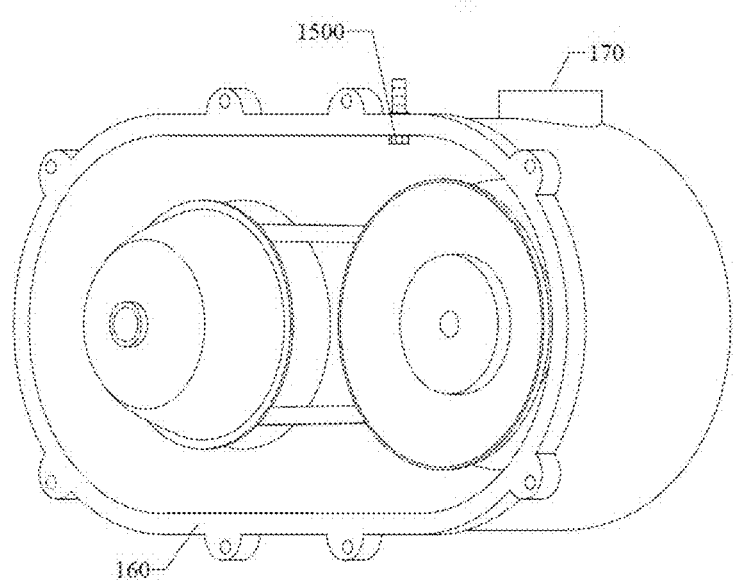

RTD Thermowell Positioned
Inside CVT Housing Exhaust

READING INTERNAL TEMPERATURE OF CONTINUOUSLY VARIABLE TRANSMISSIONS

CROSS-REFERENCE TO RELATED CASES

The present application claims the benefit of U.S. Provisional Patent Application No. 62/992,178, filed on Mar. 20, 2020, which is hereby incorporated by reference in its entirety.

FIELD OF THE INVENTION

The present application relates to the field of belt-driven transmissions. More particularly, the present application relates to the measuring of a temperature of a continuously variable transmission (CVT) and its related components to monitor the stress and wear on CVT components and to avoid failure of those components.

BACKGROUND OF THE INVENTION

Continuously variable transmissions (CVTs) are the predominant transmission used in all-terrain vehicles such as 4 wheelers and side by sides, and other small, motorized vehicles such as snowmobiles, golf carts, motor scooters, and utility vehicles. For these vehicles, the CVT typically consists of a pair of variable width pulleys, whereas one pulley connects to the engine and the other pulley sends power to the wheels. These pulleys are known as clutches, whereas the primary or drive clutch is connected to the engine and the secondary or driven clutch is connected to the transmission/transaxle or the like.

CVT designers must account for the heat that is generated by the CVT system in order to avoid heat-related damage. This heat is primarily a result of the friction between the drive belt and the clutches. With increased horsepower, today's high-performance equipment introduces difficult challenges as even more heat is generated as result of clutch slippage during acceleration and deceleration events. This heat can significantly affect the service life of CVT components such as the front movable drive (FMD), clutch pulley, clutch outer, and belt. Designers commonly rely on air cooling to minimize heat buildup in a CVT. As a general rule for overall durability and service life of the CVT and its components, the degree of heat generated at CVT components needs to be minimized.

With the reliance on air to cool the CVT system, designers of CVT systems on all-terrain vehicles face even more challenges because these CVT systems typically have a cover or housing with a sealing gasket over them to protect the CVT components from exposure to water, dirt, mud and other contaminates that are common to the off road environment. It is imperative that a sealed CVT system continually receives fresh air, allowing the fresh air to contact the drive belt and clutches to absorb the heat, and then exhaust the heated air. For this process to happen air movement needs to occur. The air movement is typically generated by a fan that is integrated with the primary clutch. In this way, as the engine runs and the primary clutch spins, the fan is continuously causing air movement.

BRIEF DESCRIPTION OF THE DRAWINGS

FIG. 15 is a partial cut-away view of a resistance temperature detector (RTD) in a thermowell receptacle.

FIG. 16 is an isometric view of a CVT inside a CVT housing that contains a resistance temperature detector in a thermowell receptacle that can read air temperature inside the CVT housing.

FIG. 17 is a top plan view of the CVT of FIG. 16.

DETAILED DESCRIPTION

Identifying the Need to Monitor Belt Operating Temperature

There is no CVT cooling system that can keep the temperature of the CVT components at a safe temperature under all conditions. Because of the variable conditions that the CVT equipped vehicle is operating in, without feedback it is impossible for the operator to know that the CVT components are approaching dangerous temperatures and failure of the CVT components is likely. The disclosed embodiments provide feedback as to the temperature of the CVT and its component parts. This feedback is then used to protect the CVT system by reducing load on the CVT system either by suspending vehicle movement altogether or by reducing the vehicles speed to lighten the load on the CVT system. In both of these scenarios the CVT system is allowed to cool and return to safe operating temperatures.

The disclosed embodiments provide monitoring of CVT systems using two different methods. The first method uses an infrared thermometer that reads the infrared emissions from the CVT components. The infrared thermometer can be positioned such that it can detect the infrared emissions from the stationary, non-horizontally moving sheave of either the primary or secondary clutch. The infrared thermometer can also be positioned such that it can detect the infrared emissions from the belt that connects the two clutches. The temperature sensor in these embodiments is thermally isolated from the CVT housing to which the sensor is mounted.

The second method uses a temperature detector to monitor the temperature of the air within a covered CVT system or the air being exhausted from a covered CVT system. This method of protection is based on test data that shows a relationship between the air temperature in the CVT system or being exhausted from the CVT system and the temperature of the CVT components themselves. The makeup of the temperature sensor used to measure the temperature of the air can be based on a number of common temperature monitoring principles including a resistance temperature detector (or RTD), a thermocouple, or a temperature switch.

Figure 22:
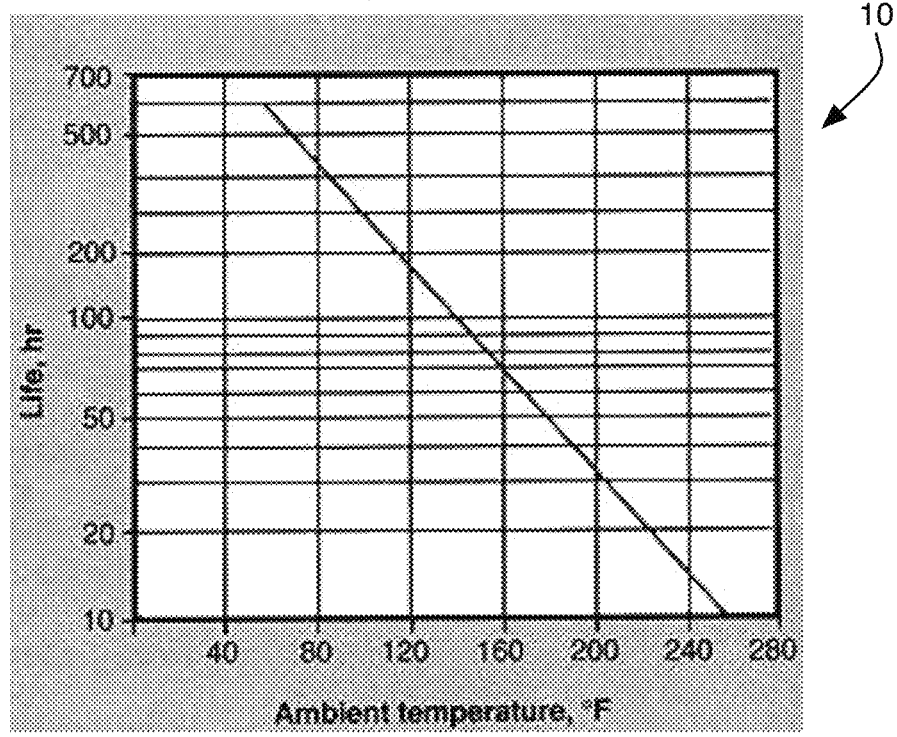
FIG. 22 is a data chart comparing belt life to ambient temperature.

Even under normal conditions, drive belts heat up just from the friction of the belt contacting the surface of the clutches or from the heat of the engine that is transferred to the clutches and transferred to the belt when it contacts the clutches. Belt manufacturers account for this and design drive belts to be temperature resistant up to "defined" temperature limits. Exceeding these temperature limits will diminish the life of the belt. Belt overheating describes a condition where the belt exceeds manufacturer temperature limits. The result of belt overheating depends upon how far the belt exceeds these manufacturer temperature limits. For example, in one technical article, Gates (a popular drive belt manufacturer) claims that "acceptable service" from a belt will occur if a belts temperature is maintained below 160° F. GatesFacts Technical Information Library, "Hot and Cold Running Belts," The Gates Rubber Company (now Gates Corporation, or "Gates"), Denver, Colo., October 1992. This Gates article contains a chart 10, shown in FIG. 22, that maps service life for a belt against ambient temperatures. Gates mentions that drivers are often willing to accept decreased belt performance that comes from running belt temperatures above 160° F. While this is true, there is a difference between decreased belt performance (belt lifetime) and eminent belt failure.

The applicant has performed its own test that confirms these results from Gates. However, in test performed on a Ranger branded utility terrain vehicle (from Polaris Inc., Medina, Minn.) utilizing tracks, it was difficult to keep the belt temperature at or below 160° F. Testing revealed that temperatures closer to 175° F. were common in non-snow conditions. With snow conditions, tests revealed temperatures as high as 250° F. These tests have demonstrated that the service lives from 1992 shown in chart 10 tend to be conservative at standard operating temperatures, at least for today's belts. For example, if operating a belt at 160° F., the temperature threshold at which Gates proclaims acceptable service, then chart 10 indicates that an expected belt life of 70 hours. In recent tests at a 170° F. belt temperature, the belt operated successfully for double the hours (140 hours plus) and the belt did not fail. On the flip side, the data in chart 10 for higher belt temperatures (240° F.) appears to be too liberal. At this temperature, chart 10 indicates a belt life of 14 hours. Numerous test runs have consistently shown that obtaining this temperature on a drive belt means the belt will typically fail in less than 1 hour.

When running a Polaris Ranger with tracks in snow, belt temperatures will easily average 200° F. Tests show that if you can keep your maximum belt temperature at or below this temperature, a new belt will last for many hours without belt failure. However, everything changes quickly if the belt temperature rises above this, and in snow conditions it easily can. Without a system to warn a user that their belt temperature is crossing this temperature threshold, belt failures are practically guaranteed. Belt failures are undesirable and rarely happen in convenient places.

Sensing Operating Temperature in a CVT

Figure 1:
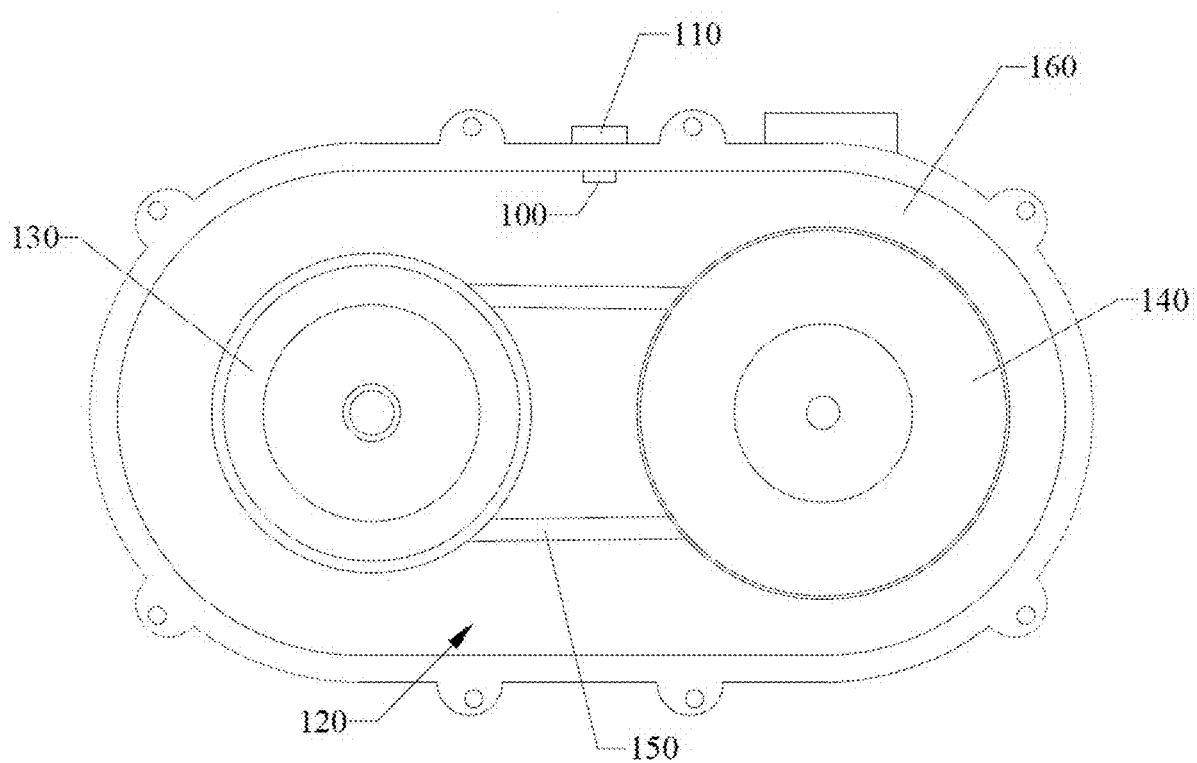
FIG. 1 is a front plan view of a continuously variable transmission (CVT) inside a CVT housing that contains an infrared temperature sensor aimed at the belt of the CVT.
Figure 2:
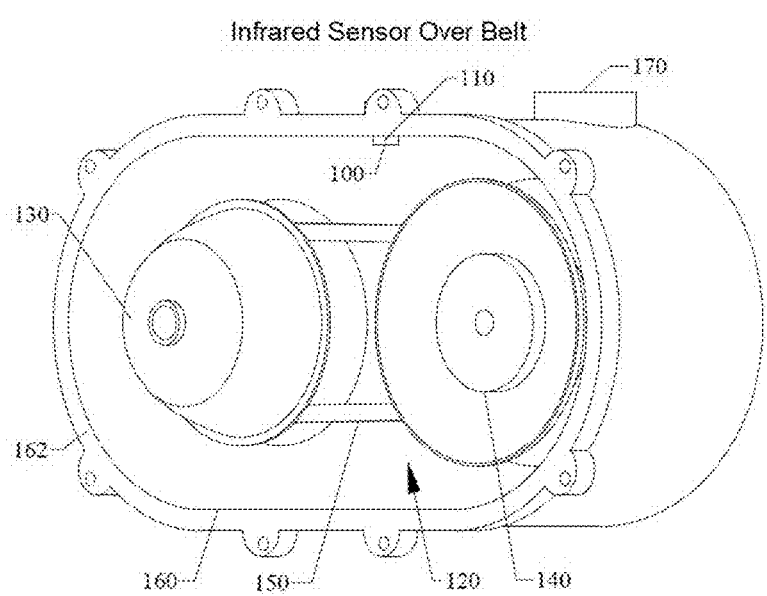
FIG. 2 is an isometric view of the CVT of FIG. 1
Figure 3:
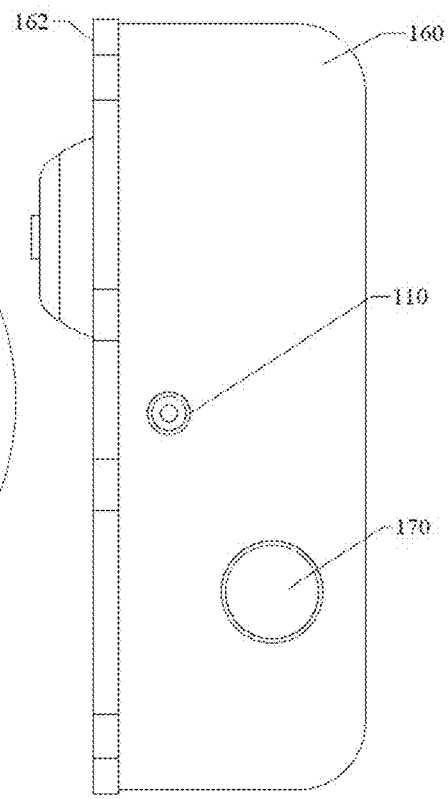
FIG. 3 is a top plan view of the CVT and CVT housing of FIG. 1
Figure 4:
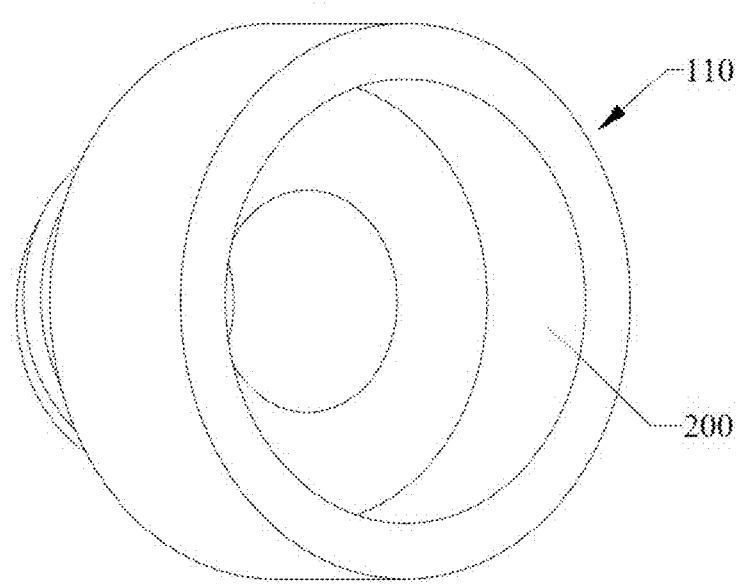
FIG. 4 is a photograph of a sensor housing.
Figure 5:
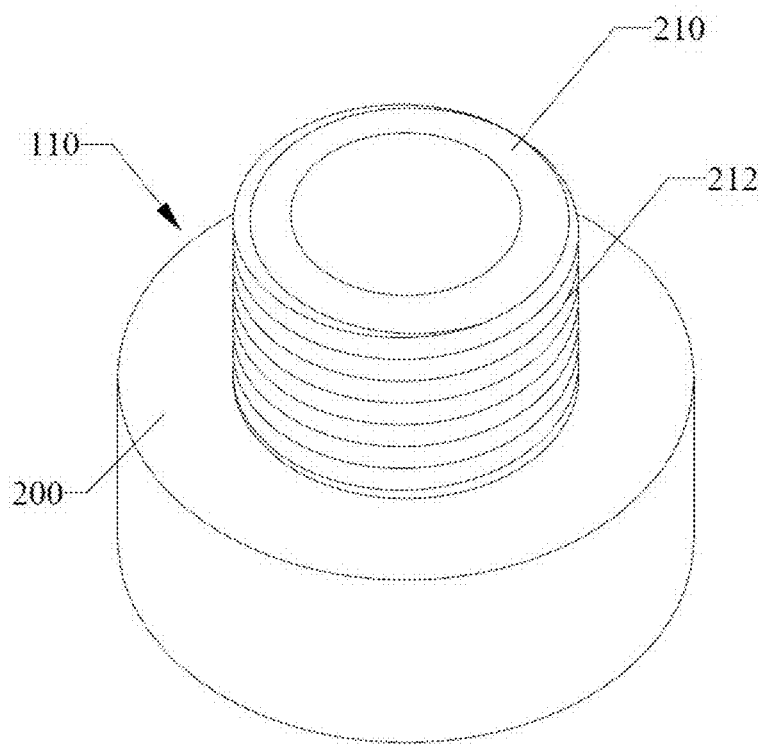
FIG. 5 is a second photograph of the sensor housing of FIG. 4.
Figure 6:
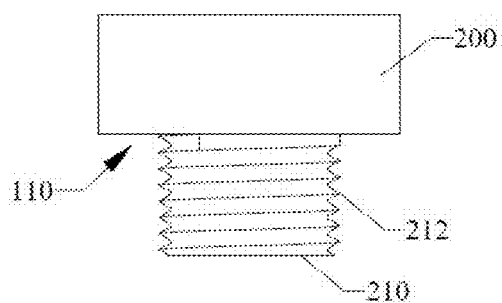
FIG. 6 is a front view of a sensor housing showing hollowed out portions in dashed lines.
Figure 7:
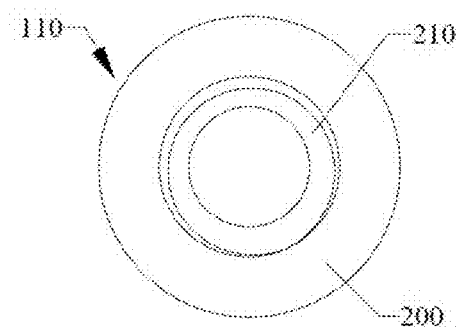
FIG. 7 is a top view of the sensor housing of FIG. 6.
Figure 8:
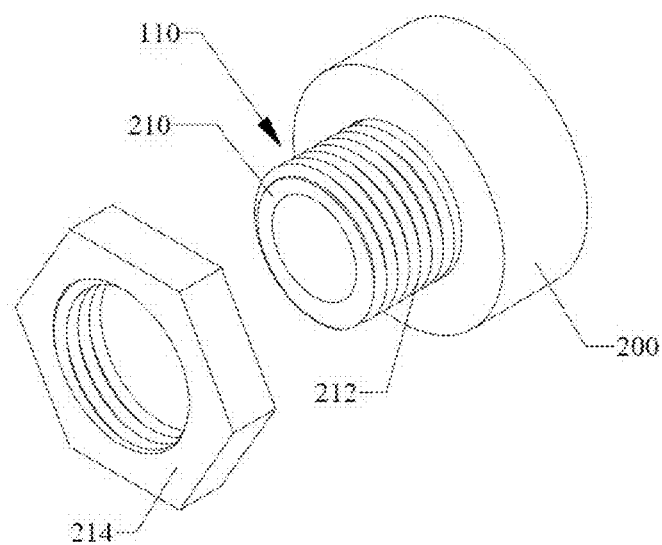
FIG. 8 is a side-bottom isometric view of the sensor housing of FIG. 6.

Multiple embodiments have been discovered that successfully measure operating temperature in a CVT in order to avoid belt failures. One embodiment measures the belt temperature directly using a thermally isolated infrared sensor. FIGS. 1-3 shows such an embodiment in the context of a Continuously Variable Transmission ("CVT") 120. The CVT 120 consists primarily of a primary clutch 130 attached to an engine, a secondary clutch 140 attached to a transmission or transaxle, and a belt 150. A temperature sensor 100 is positioned to read the temperature of a belt 150 of the CVT 120. The sensor 100 in one embodiment is an infrared heat sensor secured in a sensor housing 110. The sensor housing 110 is positioned above the belt 150 within a CVT housing 160. The CVT housing 160 surrounds the CVT 120 including the primary clutch 130, the secondary clutch 140, and the belt 150. Although the CVT housing 160 is shown as covering only the rear side of the CVT 120 in FIG. 2 and the right side in FIG. 3, this is because only half of the housing 160 is shown in order to reveal the components of the CVT 120. In practice, a second half of the housing 160 (along with a gasket) would completely enclose and seal the CVT 120. The second half and gasket would attach to the shown portion of the CVT housing 160 along lip or edge 162. FIGS. 2 and 3 show an exhaust air port 170 for the CVT housing 160. As explained above, air passes through the CVT 120 in order to cool the components. The heated air then leaves the interior of the CVT housing 160 through port 170.

The sensor housing 110 is shown in more detail in FIGS. 4-8. The housing consists of a cup 200 and a stem 210. As can be seen in those figures, both the cup 200 and the stem 210 have a circular cross-section, with the width of the cross-section being greater at the cup 200 than the stem 210.

In one embodiment, both the cup 200 and the stem 210 are made up of a material called polytetrafluoroethylene (PTFE). PTFE is better known by its tradename "Teflon," and one producer is DuPont de Nemours, Inc. ("DuPont") of Wilmington, Del. DuPont has identified the thermal conductivity of PTFE, which, per ASTM method D435, is 0.25 W/m·K. The chart 900 of thermal conductivity shown in FIG. 9 reveals that, with this thermal conductivity, PTFE is a very poor thermal conductor. In fact, PTFE is generally considered to be a thermal insulator.

In some embodiments, the stem 210 has external threads 212. The stem 210 is sized to pass through a hole in the CVT housing 160. The stem 210 is preferably held in place with a nut 214 (not shown) that passes over the stem 210 and engages with the threads 212. The nut 214 secures the sensor housing 110 in place by tightening on the threads 212 to secure the CVT housing 160 between the nut 214 and the cup 200. The thickness of the nut 214 can be selected so that it will provide surrounding protection to the end of the stem 210 portion against debris or other destructive elements (such as a broken belt) moving within the CVT housing 160.

The nut 214 can also be constructed of the same thermal insulator as the sensor housing 110, such as PTFE. Alternatively, the nut 214 can be plastic such as nylon. In some embodiment, the nut 214 is made of metal. A metallic nut 214 will not interfere with the thermal isolation of the sensor 100 since the sensor remains within the thermal isolation of the sensor housing 110. A metal nut 214 would, however, greatly improve the ability of the sensor housing 110 with withstand physical impacts from debris or a broken belt inside the CVT housing 160.

Figures 9, 10:
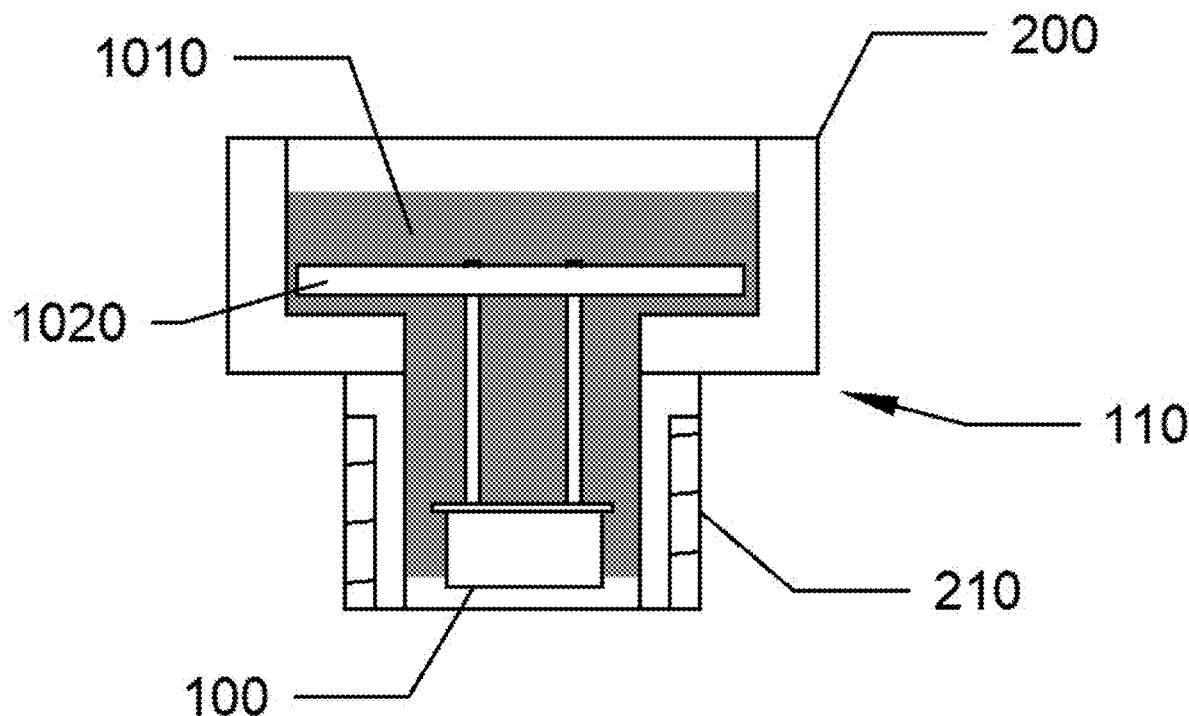
FIG. 9 is a table of thermal conductivity of materials.
FIG. 10 is a partial cut-away view of an infrared temperature sensor mounted in a sensor housing.

The protective feature of the nut 214 is important because, as shown in FIG. 10, the actual infrared sensor 100 is placed into this end portion of the stem 210. The wiring for the sensor 100 passes through the stem 210 into the cup 200 of the sensor housing 110 where the wiring connects to the sensor mounting circuit board 1020. The circuit board 1020 will generally be larger than the actual sensor 100 and will generally be large enough that it would not fit within the interior of the stem 210. The cup 200 can be sized so as to allow the circuit board 1020 to fit within it. In some embodiments, the circuit board 1020 is round or circular in shape and sized to fit within, but to mostly fill, the cup 200, which allows for ease in centering the board 1020 and the attached sensor 100 during construction.

Figure 23:
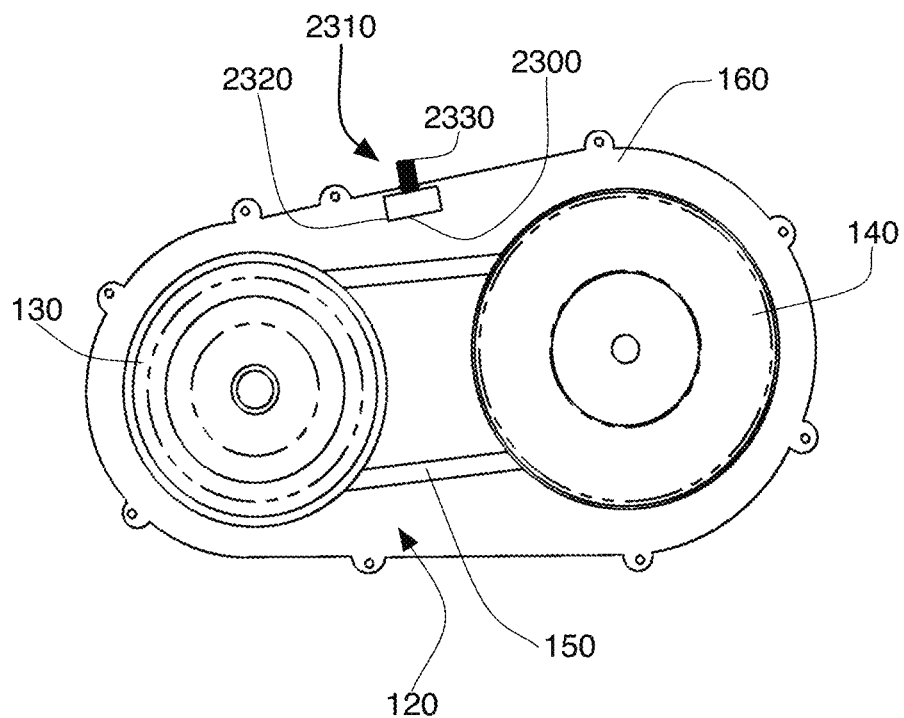
FIG. 23 is a front plan view of a CVT of FIG. 2 with an alternative configuration for a temperature sensor housing.

It is also possible to position the cup 200 on the interior of the CVT housing 160 with the stem passing through a hole to the exterior of the housing 160 as shown in FIG. 23. While this construction provides a good ability to obtain an infrared temperature reading on the components of the CVT, the cup 200 itself has a thicker profile than the portion of the stem 210 that extends through to the interior of the CVT housing 160 as shown in FIG. 1. Because of this thicker profile, configuring the sensor housing 110 so that the cup 200 is in the interior of the CVT housing 160 subjected the housing 110 and the sensor 100 to more damage than the reverse configuration of FIG. 1.

The sensor 100 and sensor mounting circuit board 1020 is held in place using a ScotchWeld Epoxy Adhesive DP110 (Gray) from 3M (Maplewood, Minn.). This adhesive 1010 was selected due to its poor thermal conductivity. According to 3M, this adhesive has a thermal conductivity of 0.104 BTU ft/(h ft$^{2\circ}$ F.) or 0.18 W/m·K. This epoxy 1010 is located between the sensor 100 and the stem 210 portion of the housing 110 in which the sensor 100 sits.

The above-described configuration specifically avoids the use of thermally conductive materials and epoxies. Rather, the material of the housing 110 has been deliberately selected to be a thermally insulating material, and the sensor 100 is fixed with a thermally insulating epoxy 1010. This means that the housing 110 does not and cannot act as a heat sink which would dissipate heat away from the infrared sensor 100. Rather, the housing 110 thermally isolates the sensor 100.

Sensor manufacturers have explained that sensor accuracy can be guaranteed only when the sensor is in thermal equilibrium when there are no temperature differences across the sensor package. In particular, sensor manufacturers warn against placing heating or cooling elements behind or beside the sensor. If the sensor housing 110 functioned as a heat sink, the sides and rear of the sensor 100 would be subject to a continuous cooling effect, as this is the very purpose of a heat sink. This cooling effect may directly cause inconsistencies or variations in accuracy of the temperature readings of the sensor 100. Consequently, the embodiment of the sensor housing 110 shown in FIG. 10 thermally isolates the sensor 100 and thereby allows the sensor 100 to reach a temperature consistent with its ambient temperature. This thermal equilibrium leads to greater accuracy in the infrared temperature readings of the sensor 100. If the sensor housing 110 functioned as a heat sync, thermal equilibrium would be much harder to obtain than with a thermally isolated housing 110.

It is clear from FIGS. 1-3 that the sensor 100 sits on the inside of the CVT housing 160, as the sensor 100 is positioned proximate to the end of the stem 210, and this end is positioned within the interior of the CVT housing 160. It would be possible to mount the sensor 100 on the exterior of the CVT housing 160 with the sensor 100 reading the temperature of the belt 150 through a hole in the CVT housing 160. In this way, the sensor housing 110 passes through the hole in the CVT housing 160 but leaves the actual sensor 100 on the outside of the CVT housing 160 looking through that hole. Unfortunately, this configuration distances the sensor 100 from the belt 150 being measured. Furthermore, it is likely that the infrared sensor 100 located in this type of configuration would read the temperature of a portion of the sensor housing 110 that passes through the CVT housing 160. The configuration shown in FIGS. 1-3 avoids this issue.

In the above configuration, the sensor housing 110 is deliberately positioned above the belt 150. Locating the sensor 100 on the inside of the CVT housing 160 will therefore place the sensor 100 closer to the belt 150 than if the sensor were outside the CVT housing 160. Thus, the sensor positioning shown in FIGS. 1-3 gives a more accurate measurement of that belt 150 because the sensor 100 is both closer to the belt 150 and because the sensor 100 picks up fewer infrared emissions from non-belt objects that should not be measured, such as portions of the sensor housing 110 or the CVT housing 160 itself.

Infrared sensors 100 come in a variety of fields of vision, ranging in some cases from 5° to 120°. The close positioning of the sensor 100 to the belt 150 allows for the use of a sensor 100 that has a wider field of vision. If a wider field of vision sensor viewed the belt 150 through a hole in the CVT housing 160 (as opposed to from inside the CVT housing 160), the sensor 100 would read the temperature of the CVT housing 160 (or the cylinder of the sensor housing 110) as well as the belt 150, thereby creating inaccurate readings. In other words, externally positioned sensors must have a narrow field of view to view through the hole of the CVT housing 160. The use of a narrow field of vision risks greater inaccuracies caused by temperature variations on the sensor 100 itself, as it is known that narrow fields of visions will cause the sensor 100 to be more susceptible to inaccuracies caused by these variations. The configuration of the sensor 100, sensor housing 110, and CVT housing 160 allows for the use of a wider field of vision in the sensor 100, meaning that the sensor 100 is not as susceptible to inaccuracies due to temperature variations across the sensor package.

In some embodiments, a glass or other protective cover is placed over the infrared sensor 100 on the end of the stem 210 portion of the sensor housing 100. This provides some additional protection to the infrared sensor 100. In most cases, however, additional protection is not required. Furthermore, while protection for the sensor 100 is useful, the cover itself would itself be subject to damage and may be more vulnerable than the sensor 100 without the cover.

In still other embodiments, the sensor housing 110 is not formed with a cup 200 and a stem 210. For example, a simple cylindrical shape could be used that would effectively be the stem 210 without the cup 200. Wiring from the sensor 100 would simply exit the cylindrical sensor housing on the exterior of the CVT housing 160. This would, of course, forgo some of the advantages of the cup-and-stem shape shown in FIGS. 4-8, including the ability to use a round circuit board 1020, the ability to use the cup 200 as a stop to ensure proper insertion of the stem 210 within a hole of the CVT housing 160, or the ability to secure the CVT housing 160 between the cup 200 and the nut 214. Even a conical or frustoconical shape could be used for the sensor housing 110.

Figure 11:
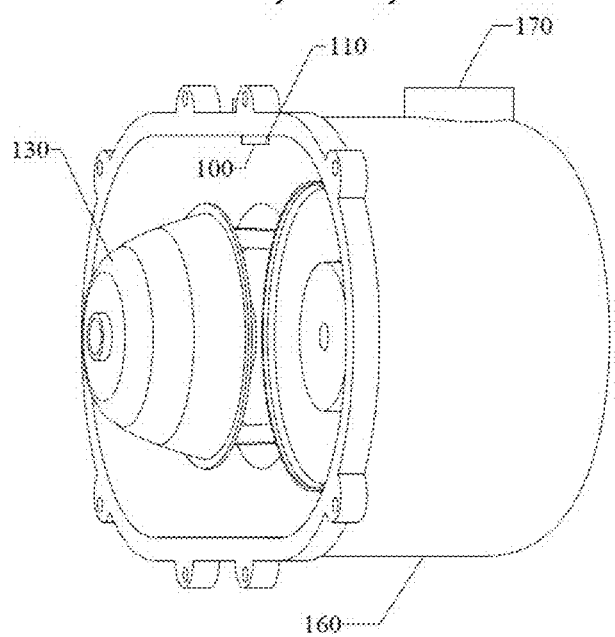
FIG. 11 is an isometric view of a CVT inside a CVT housing that contains an infrared temperature sensor aimed at the stationary primary sheave of the CVT.
Figure 12:
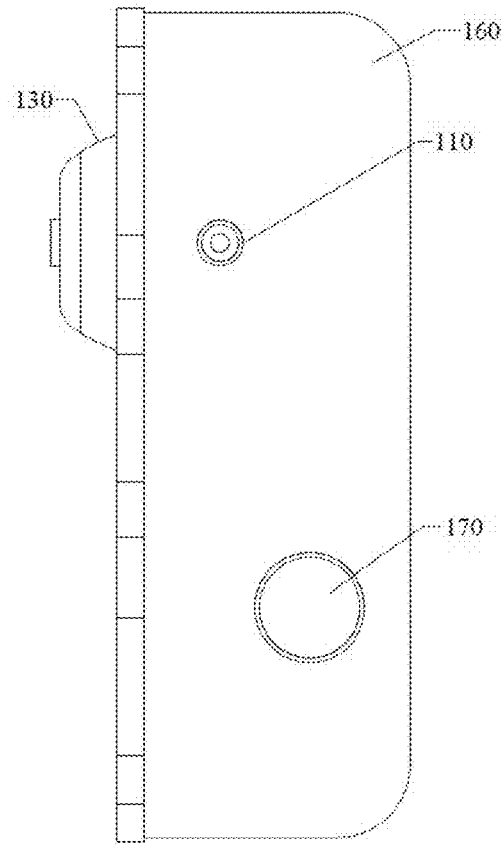
FIG. 12 is a top plan view of the CVT of FIG. 11.

FIGS. 11 and 12 shows another embodiment where the infrared sensor 100 is mounted in its sensor housing 110 directly over the primary sheave of the primary clutch 130. The primary sheave is stationary in the primary clutch. Thus, by positioning the sensor 100 over the stationary portion of the primary clutch 130, the sensor 100 is able to determine the temperature of the primary clutch 130. This configuration can have advantages over reading temperatures from the belt 150 as the stationary primary sheave will not move distance wise from the infrared temperature sensor 100 during operation. The belt 150, in contrast, will move closer and further from the stationary temperature sensor 100 when the configuration of FIGS. 1-3 is used, which make it more complicated to select the perfect field of vision of the sensor 100 with respect the distance and width of the belt 150. The configuration of FIGS. 11 and 12 faces no such difficulty.

Figure 13:
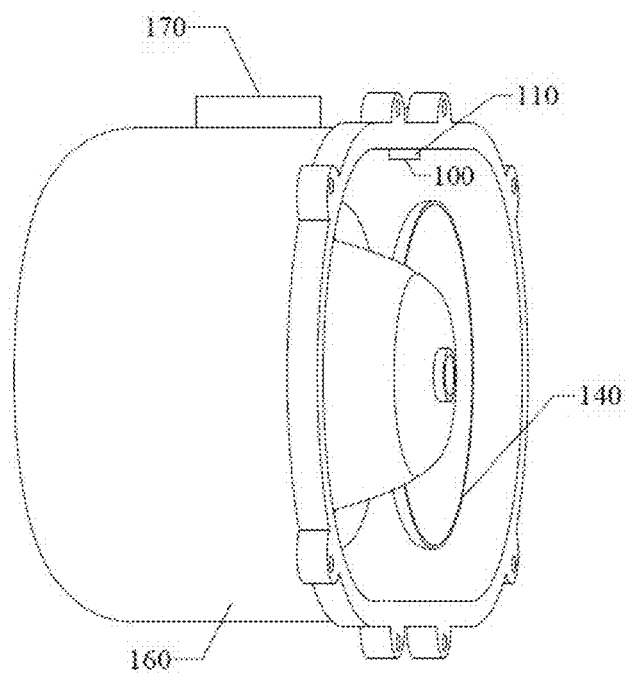
FIG. 13 is an isometric view of a CVT inside a CVT housing that contains an infrared temperature sensor aimed at the stationary secondary sheave of the CVT.
Figure 14:
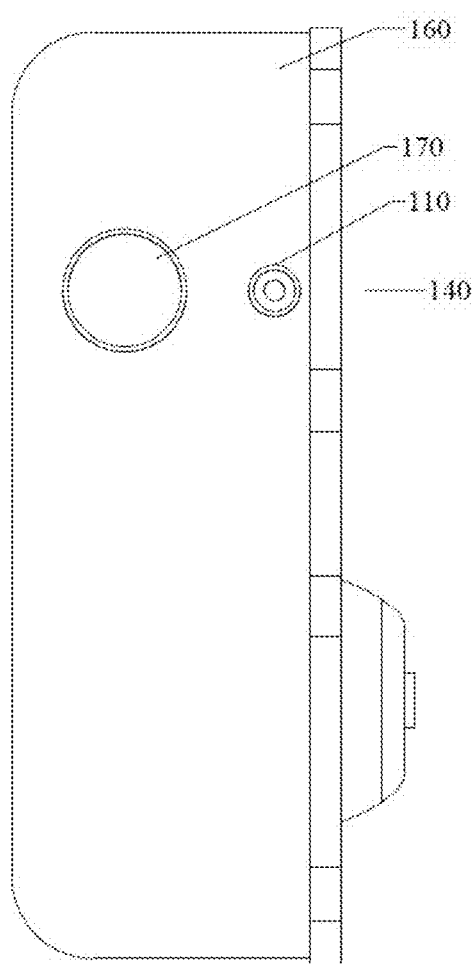
FIG. 14 is a top plan view of the CVT of FIG. 13.

Similarly, FIGS. 13 and 14 show the infrared temperature sensor 100 positioned so as to read the temperature of the stationary secondary sheave of the secondary clutch 140. This configuration has the same advantages as reading the temperature of the sheave of the primary clutch 130, shown in the configuration of FIGS. 11 and 12. All configurations would ideally read a similar temperature, as the temperatures of these various components 130, 140, 150 will all be similar during operation of the CVT 120.

Exhaust Air Temperature Embodiment

Another embodiment measures the temperature of the air being exhausted from the sealed CVT using a resistance temperature detector (RTD). Through extensive testing in multiple conditions (snow, no snow, high outside temperature, low outside temperature), it has been established that there is a consistent relationship between the exhausted air temp and the belt temperature.

FIG. 15 shows a resistance temperature detector (or RTD) 1510 inside a thermowell 1500 to create a sensor assembly 1550. A thermowell 1500 is a receptacle for a temperature sensor (such as an RTD 1510) that chemically (and pressure-wise) separates the sensor 1510 from the environment without limiting its ability to sense the temperature of that environment. In the embodiment shown in FIG. 15, the RTD sensor 1510 is mounted at the end of a metal thermowell 1500 with its wires passing through the thermowell 1500 to a connected, shielded cable 1520. The RTD sensor 1510 is fixed in place inside of the hollow end of the metal thermowell 1500 using an epoxy seal 1530 and thermally conductive putty 1535. This seal 1530 also isolates the RTD sensor 1510 from contaminants in the environment being sensed. The thermowell 1500 is fixed to the end of the shielded cable 1520 using an adhesive lined shrink tubing 1540. The tubing 1540 is stretched over (or positioned and shrunk over) a ridged tubing connection portion of the metal thermowell 1500 and the adhesive inside the tubing 1540 prevents accidental disassembly of the RTD sensor assembly 1550. It is possible to use a hose barb with a hose end and a thread end as the thermowell 1500, although this is not a requirement as alternative constructions are possible.

The RTD sensor assembly 1550 is designed to read the temperature of the air that passes through the interior of the CVT housing 160. In FIGS. 16 and 17, the RTD sensor assembly 1550 is shown as inserted into the interior of the CVT housing 160. In fact, the location of insertion is similar to the location where the infrared temperature sensor 100 was positioned to read the temperature of the belt 150 shown in FIGS. 2 and 3. The exact location of the insertion of RTD sensor assembly 1550 is not critically important as long as this sensor assembly 1550 can read the temperature of the air as it passes through the CVT 120.

Figure 18:
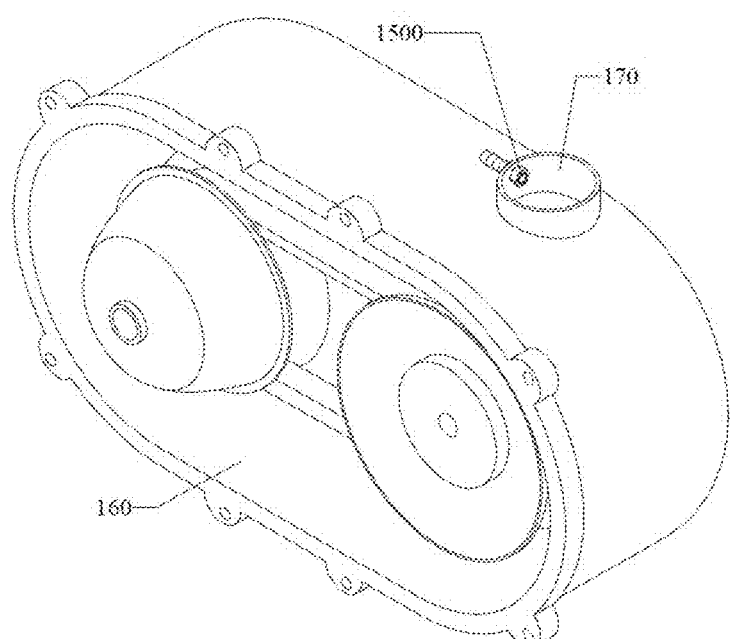
FIG. 18 is an isometric view of a CVT inside a CVT housing for which a resistance temperature detector in a thermowell receptacle has been positioned in the exhaust port to read air temperature inside the exhaust port.
Figure 19:
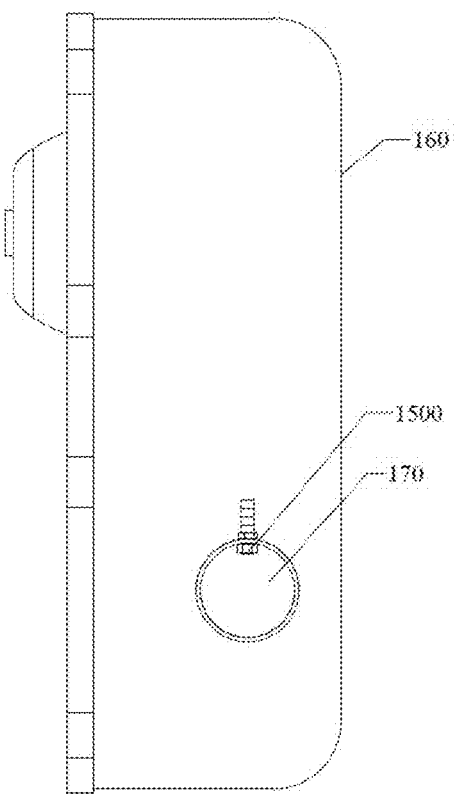
FIG. 19 is a top plan view of the CVT of FIG. 18.

In FIGS. 18 and 19, the RTD sensor assembly 1550 is positioned not to read the temperature of the air inside the CVT housing 160, but to read the temperature of the air that is being exhausted from that housing 160 through exhaust port 170. In these Figures, the temperature sensor assembly 1550 is positioned extending into the exhaust port 170 of the CVT housing 160. In other embodiments, an air tube could be connected to that port 170, and the temperature sensor 1550 could be positioned within that air tubing. It is preferred to position the RTD sensor assembly 1550 as close as possible to the interior of the CVT housing 160.

Figure 20:
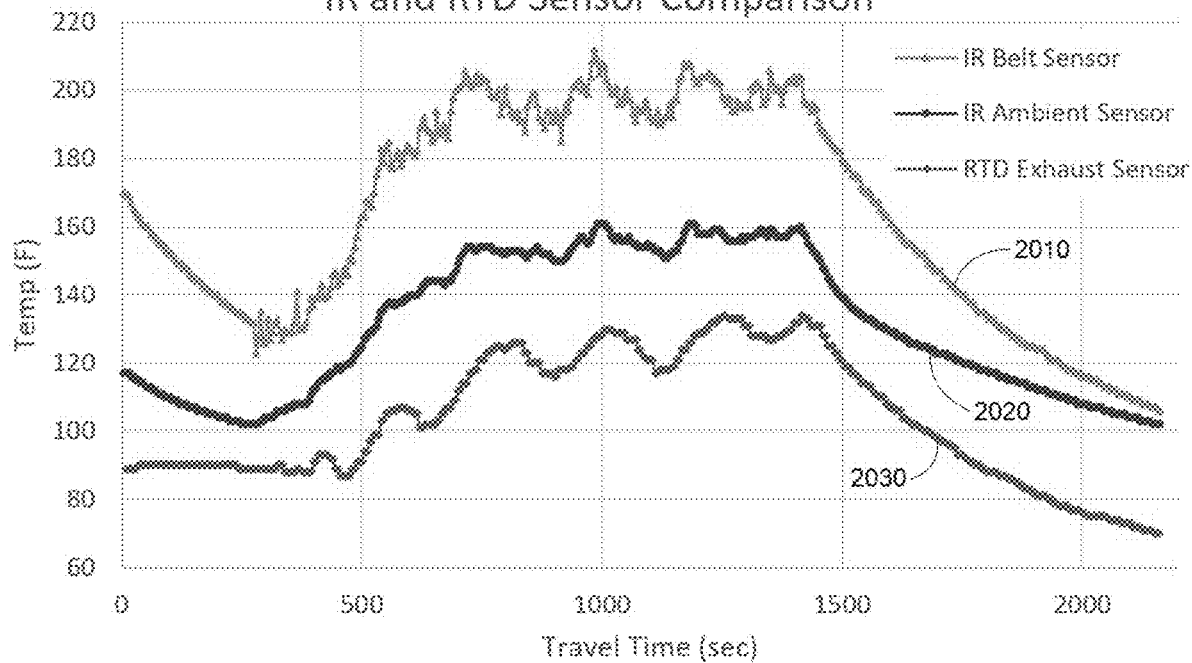
FIG. 20 is a data chart showing simultaneous temperature readings from different sensor types.

Testing confirms that using an RTD to measure air temperature in the exhaust port 170 or in the CVT housing 160 can offer similar results to using an infrared sensor reading the temperature of components within the CVT housing 160. This is shown in the test results shown in FIG. 20, in which a first line 2010 shows the reading from an infrared sensor 100 reading the temperature of belt 150, the second line 2020 shows the reading from an RTD sensor 1510 reading the air temperature inside the CVT housing 160, and a third line 2030 reading the air temperature at the exhaust port 170. Based on this data, the infrared sensor 100 reading directly from the belt 150 yields the highest reading 2010. This reading is considered the most accurate and responsive of the measurements. Ambient temperature readings from the CVT housing air 2020 yields lower, less responsive accuracy. While the housing air temperature 2020 follows the belt temperature trend 2010, the air temperature 2020 is not responsive to the heat spikes read from the belt. The exhaust air temperature 2030 also follows the belt temperature 2010, although reading a lower temperature than both belt reading 2010 and ambient IR reading 2020. In addition, there appears to be a slight delay between the peak infrared belt temperature 2010 and the peak exhaust port temperature 2030. This is likely caused by the difference in how fast the air moves through the CVT 120 and gets to the exhaust sensor.

Regardless of these differences, a reproduceable relationship exists between the RTD exhaust temperature 2030 and the infrared belt temperature 2010 that can be used to set safety temperature threshold points for the CVT 120 using either sensor configuration. However, the infrared belt sensor 2010 shall be more responsive to temperature spikes on the belt 150 and the RTD exhaust alarm threshold values must be set lower than the infrared belt alarm values.

In other words, both approaches offer protection against overheated components, with each having unique advantages over the other. For example, while the RTD sensor 1510 tends to be more reliable than the infrared sensor 100 because the RTD sensor 1510 is not susceptible to incorrect temperature readings that are commonly the result from dust or water in the sealed CVT, the infrared sensor 100 is more accurate and its fast acting character makes it better at catching rapid temperature rises during extreme belt slipping episodes.

As a consequence, one embodiment uses both the RTD sensor assembly 1550 to read air temperature and an infrared sensor 100 to read infrared temperatures of components. The two approaches can be used to confirm the accuracy of the measured temperatures, to gain the benefit of both the faster acting nature of the infrared sensor 100 and the durability of the RTD sensor 1510, and to allow either approach to back up the other in case of sensor failure. In a preferred embodiment, the infrared sensor 100 is the primary sensor, and the RTD sensor 1510 serves as a backup in case of failure of the infrared sensor 100. If the infrared sensor 100 fails or is otherwise determined to be sending erratic or unreliable data, the readings of the RTD sensor 1510 is utilized to determine whether threshold temperature values have been exceeded.

Alarms and Notifications

One embodiment of the present invention provides an alarm or other warning indicator that warns of high belt temperature, and this alarm can be generated from either the infrared sensor 100 or from the RTD sensor 1510 whenever a temperature reading surpasses a threshold value. A red, dash-mounted warning light can be turned on to notify the operator of a high belt temperature. Additionally, a smart phone interface can be provided that allows viewing of the alarm on a smart phone. Through testing, we have determined that a visual alarm is not always sufficient to catch the operator's attention. When considering that off road riding can be tricky and demands that an operator pay extra attention to the terrain ahead of them, an operator not noticing the alarm light is not a sign of negligent operating, no matter how bright the light is.

For this reason, one embodiment also provides a signal to the engine control unit (ECU) that forces the vehicle to a low maximum speed similar to the low speed that the all-terrain vehicle resorts to if the operators seat belt isn't buckled. This speed reduction not only catches the operator's attention, it also is the action that the operator needs to take to stop the belt temperature from rising any higher. An override switch can be provided that gives the user the ability to turn off the speed reduction mode if this feature is not desired at a given time.

Figure 21:
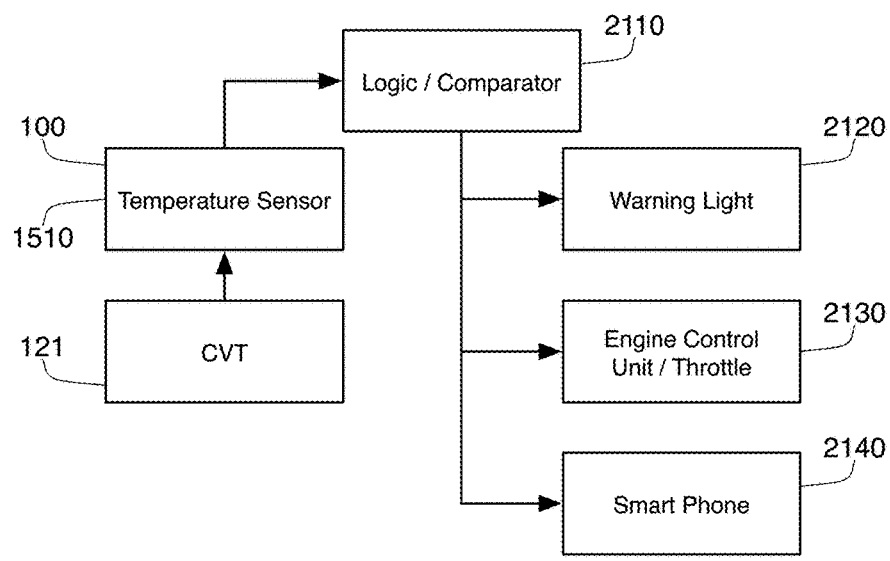
FIG. 21 is a schematic diagram of a system incorporating an embodiment of the present invention.

FIG. 21 shows a system for notifying users of excessive heat in the CVT 120 using the above-described systems and methods. A temperature sensor 100, 1510 reads a temperature from the CVT 120. As explained above, this can occur by using an infrared temperature sensor 100 to read the temperature of the belt 150, primary clutch 130, or secondary clutch 140 or by using an RTD sensor 1510 to read the air temperature inside the CVT housing 160 or exhausted air port 170 or passageway. Logic 2110, which may take the form of digital logic or a programmed processor, or may take the form of a simple comparator or switch, determines whether the determined temperature exceeds a warning value. The warning value can be determined for each method of reading temperature so as to reflect minor variations in the resulting temperatures from the differing methods described above. In one embodiment, the warning value for an RTD sensor 1510 reading air temperature is 155 degrees Fahrenheit, while the warning value for an infrared temperature sensor 100 reading the temperature of a belt 150 or clutch component is 170 degrees Fahrenheit. If this warning value is exceeded, the user of the vehicle incorporating the CVT 120 is warned. This warning can take place by illuminating a warning light 2120, by limiting the throttle or speed of the device 2130, and/or by submitting a warning notification to an app running on a mobile device such as a smart phone 2140.

In some embodiments, the logic uses warning values controlled by the customer. In this way, the customer can determine whether they want to prioritize limiting damage to the belt by avoiding any excessive heat (by setting a low warning value) or whether they want to allow some heat but still have the safety of knowing when extreme heat that can cause immediate damage is reached (by setting a high warning value).

Internal Cup Embodiment

FIG. 23 shows another embodiment for an infrared sensor 2300 within a thermally insulating sensor housing 2310, This housing 2310 is again positioned through a hole in the CVT housing 160 so as to position the infrared sensor 2300 to read the temperature directly off of the belt 150. The housing 2310 has both a cup portion 2320 and a stem portion 2330, but this time the infrared sensor is positioned within the cup portion 2320 instead of the stem portion 2330. Furthermore, in this embodiment the cup portion 2320 is positioned within the interior of the CVT housing 160 with the stem 2330 being positioned primarily on the outside of the CVT housing 160. As explained above, the reverse configuration of cup and stem shown in FIG. 1 is beneficial because it is easier to reduce the exposure of the infrared sensor 2300 to damage within a lower profile provided by the stem 210 and the protection provided by the nut 214. However, it is sometimes difficult to fit the infrared sensor 2300 within an interior bore of the stem 2330, thus the configuration of FIG. 23 places the sensor 2300 within the relatively large dimensions of the cup portion 2320. Other than this configuration difference, the embodiment shown in FIG. 23 is capable of providing all of the benefits described above for the other configurations.

Non-Enclosed CVT Embodiment

Figure 24:
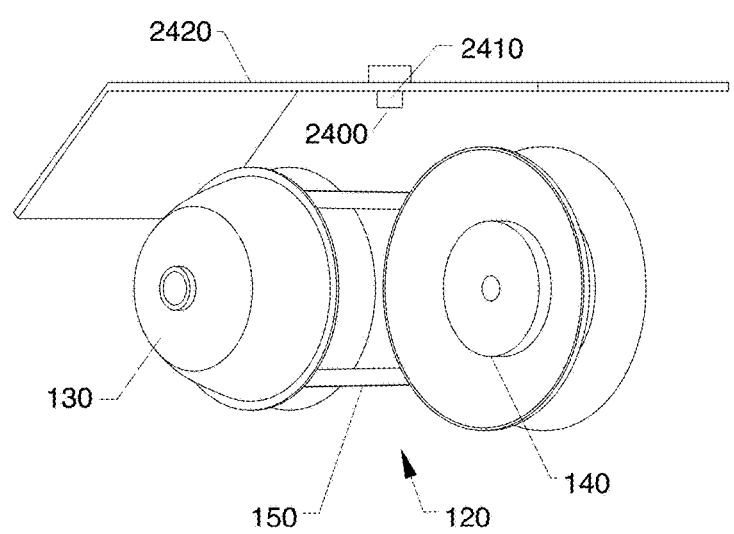
FIG. 24 is an isometric view of a CVT with a belt guard.
Figure 25:
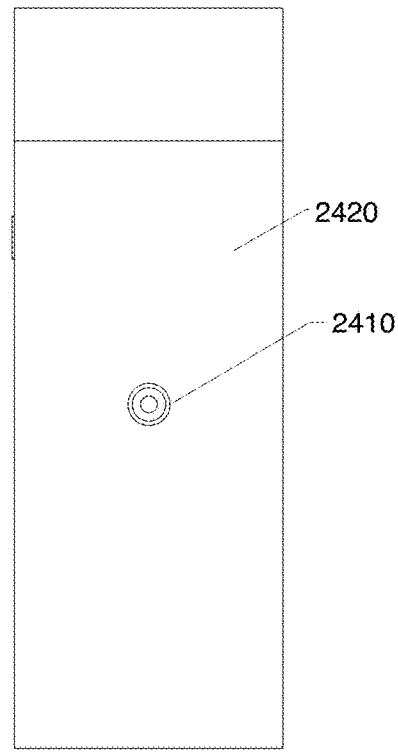
FIG. 25 is a top plan view of the CVT and the belt guard of FIG. 25.

FIGS. 24 and 25 show an embodiment of the present invention in which the Continuously Variable Transmission ("CVT") 120 is not fully enclosed in a CVT housing 160, but is, in fact, left exposed to the elements. In this embodiment, the CVT 120 is located physically near a belt guard 2420. The belt guard 2420 can take the form of a metal sheet. In FIGS. 24 and 25, the belt guard 2420 takes the form of a single, bent metal sheet. The actual shape or configuration of the belt guard 2420 is not relevant to the operation of this embodiment.

An infrared sensor 2400 located within a sensor housing 2410 is mounted on the belt guard 2420 in such a position that the infrared sensor 2400 is able to read the temperature of the belt 150. In FIG. 24, the sensor 2400 and sensor housing 2410 can be identical to the sensor 100 and sensor housing 110 described above. The open (or non-enclosed) nature of the CVT 120 will not change the operation of the infrared sensor 2400, since this sensor 2400 directly reads the temperature off of the belt 150. In particular, the sensor 2400 will remain thermally isolated from the belt guard 2420 through the use of a thermally insulating sensor housing 2410.

As shown in FIG. 24, the sensor 2400 and the sensor housing 2410 are configured such that the sensor 2400 is positioned in a narrow stem portion of the housing 2410. The sensor 2400 is on the "inner" side of the belt guard 2420 (meaning that it is on the side of the belt guard 2420 facing the CVT 120). A wider, cup portion of the sensor housing 2410 is on the outer side of the belt guard 2420 (on the side opposite the inner side). Similarly, the sensor 100 of FIG. 1 is on the inner side of the CVT housing 160 while the cup portion 200 of the sensor housing 110 is on the outer side of the CVT housing 160. Of course, as was the case with the embodiment of FIG. 23, the cup portion of the sensor housing 2410 can be reversed so that it is on the inner side of the belt guard 2420, with the sensor 2400 then being mounted within this cup portion.

FIGS. 24 and 25 show the sensor 2400 and sensor housing 2410 positioned on the belt guard 2420 to read the temperature of the belt 150. In other embodiments, the sensor 2400 and sensor housing 2410 are positioned on the belt guard 2420 to read the temperature from the stationary sheave of the primary clutch 130 or are positioned to read the temperature from the stationary sheave of the secondary clutch 140, as is shown and described above in connection with FIGS. 11 & 12, and FIGS. 13 & 14, respectively.

Note that the belt guard 2420 in these embodiments need not be used primarily to guard the belt 150 against intrusion into the CVT 120 by the user. All that is necessary is that some element provides the structure on which to position an infrared sensor 2400 in a thermally insulating sensor housing 2140 adjacent the belt 150 or the stationary sheaves of the CVT 120.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system for limiting heat-related damage in a continuously variable transmission comprising:
    a) a CVT housing having:
        i) an interior that encloses the continuously variable transmission,
        ii) an exterior, and
        iii) an exhaust port;
    b) a sensor housing passing through a hole in the CVT housing, the sensor housing having a first portion within the interior of the CVT housing and a second portion on the exterior of the CVT housing, the sensor housing being constructed of a thermally insulating material;
    c) an infrared sensor mounted within the first portion of the sensor housing and positioned to read a temperature of a component of the continuously variable transmission while the infrared sensor is thermally isolated from the CVT housing by the thermally insulating sensor housing;
    d) a resistance temperature detector positioned to read an air temperature for air that has left the interior of the CVT housing at the exhaust port;
    e) logic in communication with the infrared sensor and the resistance temperature detector, wherein the logic receives temperature readings from the infrared sensor and the resistance temperature detector, further wherein the logic determines when a temperature threshold has been surpassed; and
    f) a warning indicator that triggers a warning to a user after the logic determines that the temperature threshold has been surpassed.

2. The system of claim 1, wherein the temperature readings from the infrared sensor are primary to determine when the temperature threshold has been surpassed, further wherein the temperature readings from the resistance temperature detector are used to determine when the temperature threshold has been surpassed only after the logic has determined that the infrared sensor is not sending reliable data.

3. The system of claim 2, wherein different temperature thresholds are used for temperature readings from the infrared sensor than are used for temperature readings from the resistance temperature detector.

4. The system of claim 1, wherein the second portion of the sensor housing comprises a cup and the first portion of the sensor housing comprises a stem attached to the cup, wherein the cup has a cross-sectional width larger than a cross-sectional width of the stem.

5. The system of claim 4, wherein the cup and the stem both have circular cross sections.

6. The system of claim 5, wherein an exterior of the stem comprises threads, further wherein the sensor housing is affixed to the CVT housing using a threaded nut that tightens a portion of the CVT housing adjacent the hole between the threaded nut and the cup.

7. The system of claim 6, wherein the threaded nut is metallic.

8. The system of claim 6, further comprising a circular sensor mounting circuit board that resides in an interior of the cup and is in wired communication with the infrared sensor.

9. The system of claim 1, wherein the infrared sensor is secured within the first portion of the sensor housing using thermally insulating epoxy.

10. The system of claim 1, wherein the first portion of the sensor housing is covered with glass with the infrared sensor mounted under the glass.

11. The system of claim 1, wherein the component of the continuously variable transmission is a belt, and the sensor housing is positioned over a portion of the belt.

12. The system of claim 1, wherein the thermally insulating material is PFTE.

13. The system of claim 1, wherein the warning indicator comprises a signal to an engine control unit that forces a vehicle to a predetermined slow speed.

14. A system for limiting heat-related damage in a continuously variable transmission comprising:
    a) a physical structure adjacent the continuously variable transmission having an inner side facing the continuously variable transmission and an outer side opposite the inner side;
    b) a sensor housing constructed of a thermally insulating material having:
        i) a cup portion on the outer side of the physical structure, and
        ii) a stem portion attached to the cup portion and passing through a hole in the physical structure to the inner side of the physical structure, the stem portion having threads; and
    c) a nut on the threads of the stem portion, wherein a portion of the physical structure adjacent the hole is positioned between the nut and the cup portion of the sensor housing;
    d) an infrared sensor mounted within the stem portion of the sensor housing on the inner side of the physical structure, the infrared sensor positioned to read a temperature of a component of the continuously variable transmission while the infrared sensor is thermally isolated from the physical structure by the thermally insulating sensor housing;
    e) logic in communication with the infrared sensor, wherein the logic receives temperature readings from the infrared sensor and determines when a temperature threshold has been surpassed; and
    f) a warning indicator that triggers a warning to a user after the logic determines that the temperature threshold has been surpassed.

15. The system of claim 14, wherein the nut is metallic.

16. The system of claim 14, further comprising a sensor mounting circuit board that resides in an interior of the cup portion and is in wired communication with the infrared sensor.

17. The system of claim 14, wherein the component of the continuously variable transmission is a belt, and the sensor housing is positioned over a portion of the belt.

18. The system of claim 14, wherein the warning indicator comprises a signal to an engine to control a vehicle speed.

19. The system of claim 14, wherein the component of the continuously variable transmission is a stationary sheave of a clutch and the sensor housing is positioned over a portion of the stationary sheave.

20. A system for limiting heat-related damage in a continuously variable transmission comprising:
   a) a CVT housing having an interior that encloses the continuously variable transmission and an exterior;
   b) a sensor housing constructed of a thermally insulating material having:
      i) a cup portion on the interior of the CVT housing, and
      ii) a stem portion attached to the cup portion and passing through a hole in the CVT housing into the exterior of the CVT housing, the stem portion having threads; and
   c) a nut on the threads of the stem portion, wherein a portion of the CVT housing adjacent the hole is positioned between the nut and the cup portion of the sensor housing;
   d) an infrared sensor mounted within the cup portion of the sensor housing within the interior of the CVT housing, the infrared sensor positioned to read a temperature of a component of the continuously variable transmission while the infrared sensor is thermally isolated from the CVT housing by the thermally insulating sensor housing;
   e) logic in communication with the infrared sensor, wherein the logic receives temperature readings from the infrared sensor and determines when a temperature threshold has been surpassed; and
   f) a warning indicator that triggers a warning to a user after the logic determines that the temperature threshold has been surpassed.

* * * * *